United States Patent
Suzuki

(10) Patent No.: US 12,244,168 B2
(45) Date of Patent: Mar. 4, 2025

(54) CONTROL DEVICE, CONTROL METHOD, AND CONTROL PROGRAM

(71) Applicant: TOYOTA JIDOSHA KABUSHIKI KAISHA, Toyota (JP)

(72) Inventor: Masayuki Suzuki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 106 days.

(21) Appl. No.: 18/299,794

(22) Filed: Apr. 13, 2023

(65) Prior Publication Data

US 2023/0411986 A1 Dec. 21, 2023

(30) Foreign Application Priority Data

Jun. 21, 2022 (JP) ................. 2022-099739

(51) Int. Cl.
*H02J 7/00* (2006.01)
(52) U.S. Cl.
CPC ........ *H02J 7/00712* (2020.01); *H02J 7/0047* (2013.01); *H02J 7/0063* (2013.01); *H02J 7/0013* (2013.01)
(58) Field of Classification Search
CPC .... H02J 7/00712; H02J 7/0047; H02J 7/0063; H02J 7/0013
See application file for complete search history.

(56) References Cited

U.S. PATENT DOCUMENTS

| 2021/0247760 | A1 | 8/2021 | Kusama |
| 2022/0149643 | A1* | 5/2022 | Li .................... H02J 7/0013 |
| 2022/0289231 | A1* | 9/2022 | Takahashi .......... B60W 60/001 |
| 2022/0308120 | A1* | 9/2022 | Izumi ................ G01R 31/392 |
| 2022/0355705 | A1* | 11/2022 | Kwon ................. H02J 7/342 |

FOREIGN PATENT DOCUMENTS

JP 2021-123145 A 8/2021

* cited by examiner

*Primary Examiner* — Jared Fureman
*Assistant Examiner* — Duc M Pham
(74) *Attorney, Agent, or Firm* — Oblon, McClelland, Maier & Neustadt, L.L.P.

(57) ABSTRACT

A control device for controlling power supply from a battery to a predetermined load via an electric circuit, the control device comprising: an acquisition unit that acquires a state of the battery; and an activation control unit that is capable of performing a state transition between activation and deactivation of the control device and controls an electric circuit based on the state of the battery acquired by the acquisition unit, wherein when the state of the battery is in a state in which power can be supplied to the predetermined load after the control device is activated, the activation control unit controls the electric circuit so as to maintain a state in which the battery and the predetermined load are electrically connected, and stops a function of a part of the control device.

9 Claims, 8 Drawing Sheets

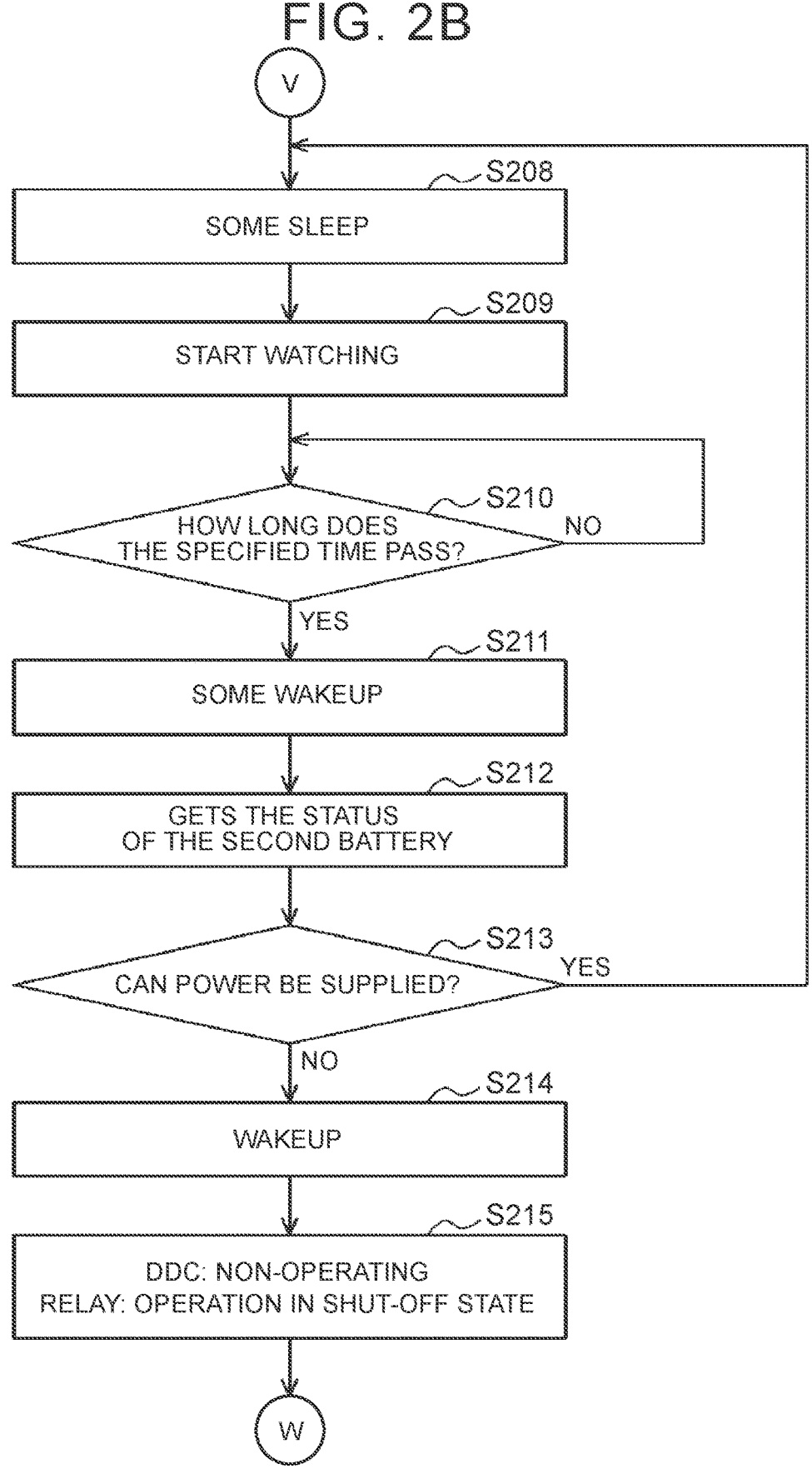

CONTROL DEVICE, CONTROL METHOD, AND CONTROL PROGRAM

CROSS-REFERENCE TO RELATED APPLICATION

This application claims priority to Japanese Patent Application No. 2022-099739 filed on Jun. 21, 2022, incorporated herein by reference in its entirety.

BACKGROUND

1. Technical Field

The present disclosure relates to a control device and the like for controlling power supply from a battery to a predetermined load or the like.

2. Description of Related Art

Japanese Unexamined Patent Application Publication No. 2021-123145 (JP 2021-123145 A) discloses a configuration in which a power supply configuration includes a primary power supply system and a secondary power supply system provided independent from each other in order to enhance reliability of a power supply of a vehicle platform in a vehicle in which autonomous driving is performed.

SUMMARY

A vehicle equipped with an autonomous driving system as described in JP 2021-123145 A only stores electric power (energy) in a battery of a secondary power supply system in a situation where an autonomous driving function is not used, such as while the vehicle is parked. There is an issue that the electric power is not effectively utilized. To solve this issue, a method of supplying electric power of a battery of the secondary power supply system to a load of a primary power supply system or the like while the vehicle is parked is conceivable. There is room for further investigation in order to effectively utilize electric power while a loss related to supply is suppressed.

The present disclosure has been made in view of the above issue. An object of the present disclosure is to provide a control device and the like capable of effectively utilizing the electric power of a battery of a secondary power supply system.

In order to solve the above issue, an aspect of the present disclosure provides a control device that controls power supply from a battery to a predetermined load via an electric circuit, and the control device includes: an acquisition unit that acquires a state of the battery; and an activation control unit. The activation control unit is able to execute a state transition between activation and stop of the control device. The activation control unit controls the electric circuit based on the state of the battery acquired by the acquisition unit. The activation control unit controls the electric circuit so as to maintain a state in which the battery and the predetermined load are electrically connected to each other and stops part of functions of the control device when the state of the battery is a state in which power is suppliable to the predetermined load after the control device is activated.

When electric power is supplied from the battery of the secondary power supply system to the load of the primary power supply system or the like, the control device according to the present disclosure stops the part of the functions of the control device while the state in which the electric circuit interposed between the battery and the load electrically connects the battery and the load is maintained. Therefore, the electric power of the battery can be effectively utilized.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 2B is a flowchart illustrating a control process performed by a control device according to a first embodiment;

DETAILED DESCRIPTION OF EMBODIMENTS

The control device of the present disclosure latches up an electrical circuit provided between the load and the battery so that the load and the battery can remain electrically connected. When there is power that can be supplied to the battery, the latch-up is activated to maintain the power supply state from the battery to the load, and the control device is put into the sleep state in which the power consumption is low. Accordingly, a decrease in the power that can be supplied from the battery to the load is suppressed, and the power is effectively utilized.

Hereinafter, embodiments of the present disclosure will be described in detail with reference to the drawings.

First Embodiment

Configuration

Figure 1:
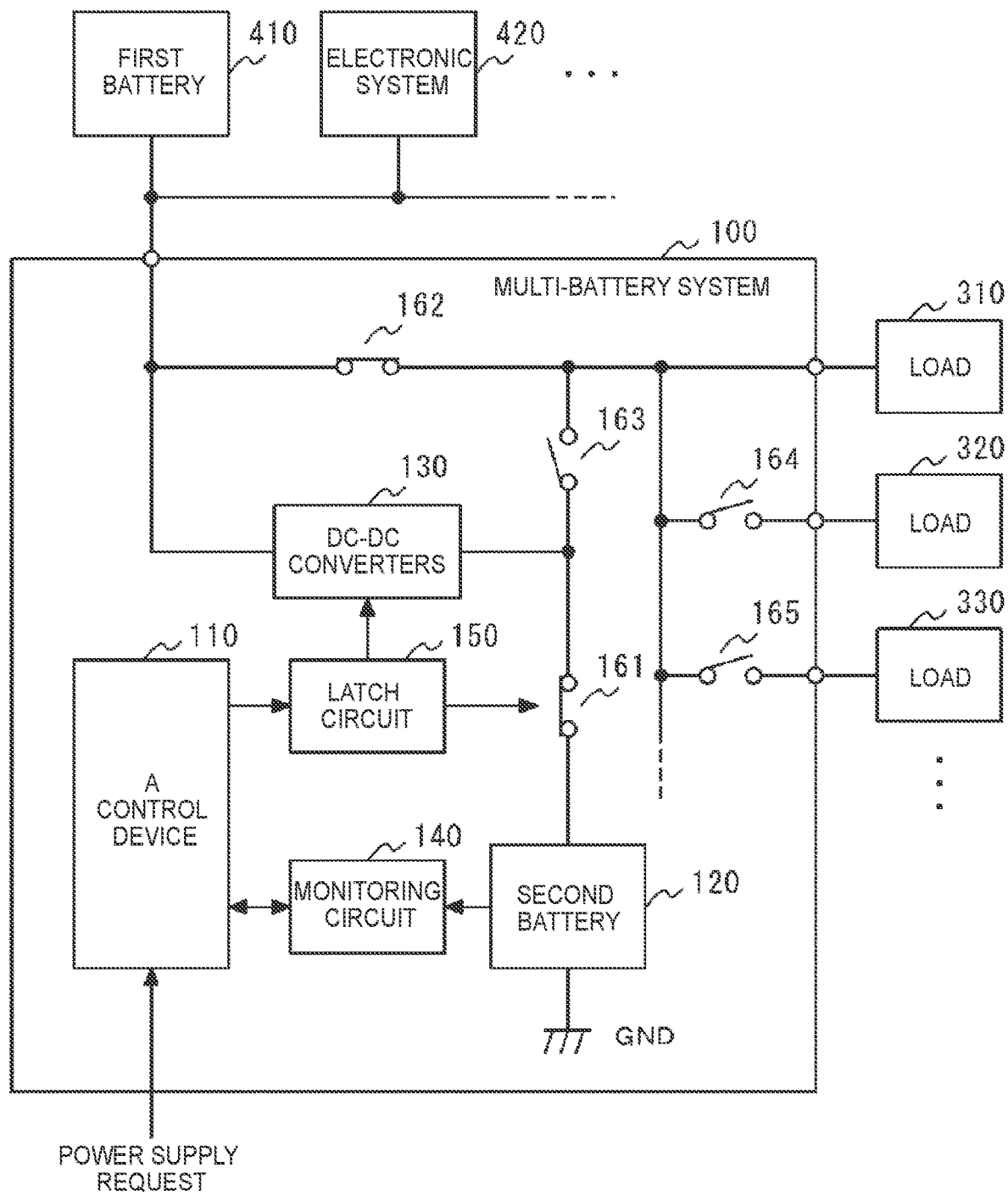
FIG. 1 is a functional block diagram of a multi-battery system including a control device according to a first embodiment of the present disclosure and a peripheral portion thereof.

FIG. 1 is a functional block diagram of a multi-battery system 100 including a control device 110 according to a first embodiment of the present disclosure and a peripheral portion thereof. The functional block illustrated in FIG. 1 includes a multi-battery system 100, a first battery 410, an electronic system 420, and a plurality of loads 310, 320, and 330 in a configuration. These configurations can be mounted on, for example, a vehicle.

The first battery 410 is a power supply source (primary power supply system) that supplies power to the electronic system 420 and a plurality of loads 310, 320, and 330. The first battery 410 is, for example, a secondary battery such as a lithium-ion battery configured to be chargeable and dischargeable. As the first battery 410, an auxiliary battery used for supplying electric power to an in-vehicle device regardless of driving of the vehicle can be exemplified as the vehicle.

The electronic system 420 is a predetermined device (load) that is supplied with electric power from the first battery 410 and is driven. The electronic system 420 may be an in-vehicle device (an air conditioner, a lighting device, or the like) that is not related to the driving of the vehicle. The number of electronic systems 420 is not limited to that shown in FIG. 1.

The plurality of loads 310, 320, and 330 are predetermined devices that are supplied with electric power and are driven by the first battery 410, which is a primary power supply system, and the multi-battery system 100, which is a secondary power supply system. The number of loads 310, 320, and 330 is not limited to that shown in FIG. 1. Examples of the plurality of loads 310, 320, and 330 include loads to be backed up (for example, an automatic driving system in the case of a vehicle) that require a redundant power supply configuration using the multi-battery system 100.

The multi-battery system 100 is a power supply system (secondary power supply system) for backing up power to the plurality of loads 310, 320, and 330 instead of the first battery 410 when an abnormality occurs in power supply from the first battery 410 to the plurality of loads 310, 320, and 330 due to, for example, a power failure of the first battery 410. The multi-battery system 100 illustrated in FIG. 1 includes a control device 110, a second battery 120, a DC-DC converter 130, a monitoring circuit 140, a latch circuit 150, and a plurality of relays 161 to 165.

The second battery 120 is, for example, a secondary battery such as a lithium ion battery configured to be chargeable and dischargeable, a capacitor, or the like. The second battery 120 is connected to DC-DC converters 130 and the relays 161 so that the power of the first battery 410 can be charged and the power stored by the second battery can be discharged to the first battery 410 and the electronic system 420. The second battery 120 is connected to a plurality of loads 310, 320, and 330 via relays 161 and 163 to 165 so that the electric power stored therein can be supplied. The second battery 120 is a power supply that supplies power for the control device 110, DC-DC converter 130, the monitoring circuit 140, the latch circuit 150, and the plurality of relays 161 to 165 to operate (start up).

DC-DC converters 130 are configured to input the power of the first battery 410 based on an instruction from the control device 110 or another electronic control unit (ECU) or the like (not shown), convert the power into the power of the predetermined voltage, and output the power to the second battery 120, or input the power of the second battery 120, convert the power into the power of the predetermined voltage, and output the power to the first battery 410 or the electronic system 420. DC-DC converters 130 form part of the electric circuit that connects the first battery 410 and the electronic system 420 (primary power supply system) to the second battery 120 (secondary power supply system).

The monitoring circuit 140 is a configuration for monitoring the state of the second battery 120. Examples of the state of the second battery 120 include physical quantities such as voltage, current, and temperature. The monitoring circuit 140 may be constituted by, for example, only a detection element such as a sensor that measures a physical quantity. The monitoring circuit 140 may be configured as an integrated circuit (IC) that further includes a processor and a memory that compute the values detected by the sensing elements.

The relay 161 is a switch element capable of switching between an electrically conductive/disconnectable state. The relays 161 are provided to switch the electric connection between DC-DC converters 130 and the second battery 120. In the embodiment of FIG. 1, the relay 161 is inserted between DC-DC converters 130 and the second battery 120. The relay 161 may be inserted between the second battery 120 and the ground (GND). The relay 161 may be a mechanical relay of an excitation type, a semiconductor relay using a field-effect transistor (for example, a MOSFET), or the like. The relay 161 constitutes a part of an electric circuit that connects the first battery 410 and the electronic system 420 (primary power supply system) and the second battery 120 (secondary power supply system).

The latching circuitry 150 is configured to hold the operating state of DC-DC converters 130 and the operating state of the relays 161, respectively, based on an instruction from the control device 110. More specifically, when a predetermined instruction is given from the control device 110 in response to the reception of the power-supply instruction, the latch circuit 150 latches up DC-DC converters 130 in a chargeable/dischargeable operation state and latches up the relays 161 in a conductive state so as to maintain a state in which the second battery 120 and the first battery 410 and the electronic system 420 are at least electrically connected. This latch-up control maintains a state in which power can be supplied from the second battery 120 to the first battery 410 and the electronic system 420 (or loads 310, 320, and 330). A known circuit configuration can be used for the latch circuit 150.

The plurality of relays 162 to 165 are switching elements capable of switching between the electrically conductive/disconnectable states based on an instruction from the control device 110 or another electronic control device (ECU) or the like (not shown). The relay 162 is inserted between the first battery 410 and the plurality of loads 310, 320, and 330. The relay 163 is inserted between the relay 161 and the relay 162. The relay 164 is inserted between the relay 162 and the load 320. The relay 165 is inserted between the relay 162 and the load 330. The number of relays 164 and 165 connecting the loads 320 and 330 to the multi-battery system 100 is not limited to that shown in FIG. 1. The number of the plurality of relays 164 and 165 connecting the loads 320 and 330 to the multi-battery system 100 increases or decreases according to the number of loads connected to the multi-battery system 100.

The control device 110 is configured to control the monitoring circuit 140 and the latch circuit 150 to effectively utilize the power of the second battery 120. The control device 110 has a function (acquisition unit) of acquiring the state of the second battery 120 via the monitoring circuit 140. In addition, the control device 110 has a function (reception unit) of receiving a predetermined power supply request from the outside of the multi-battery system 100. For example, in the case of a vehicle, the power supply request is transmitted from a load (for example, the electronic system 420) in which power consumption of the first battery 410 occurs during parking or the like, at the start of a service or the like. The control device 110 has a function (activation control unit) for instructing the latch circuit 150 based on the status of the second battery 120 and suitably controlling DC-DC converter 130 and the relay 161 when there is a power-supply demand. Further, the control device 110 has a function (activation control unit) capable of suitably transitioning between a wake-up state in which all functions are activated and a sleep state in which only some functions (for example, a function of accepting a power supply request) are activated and the remaining functions are deactivated in order to suppress power consumption. This function (activation control unit) can instruct the monitoring circuit 140 to transition between a wake-up state in which all functions are activated and a sleep state in which all functions are deactivated. Detailed control of the control device 110 will be described later.

Note that a part or all of the configuration of the control device 110 may typically be configured as a microcomputer including a processor, a memory, an input/output interface, and the like. The microcomputer can realize some or all of the various functions described above by the processor reading and executing the program stored in the memory.

Control

Figure 2A:
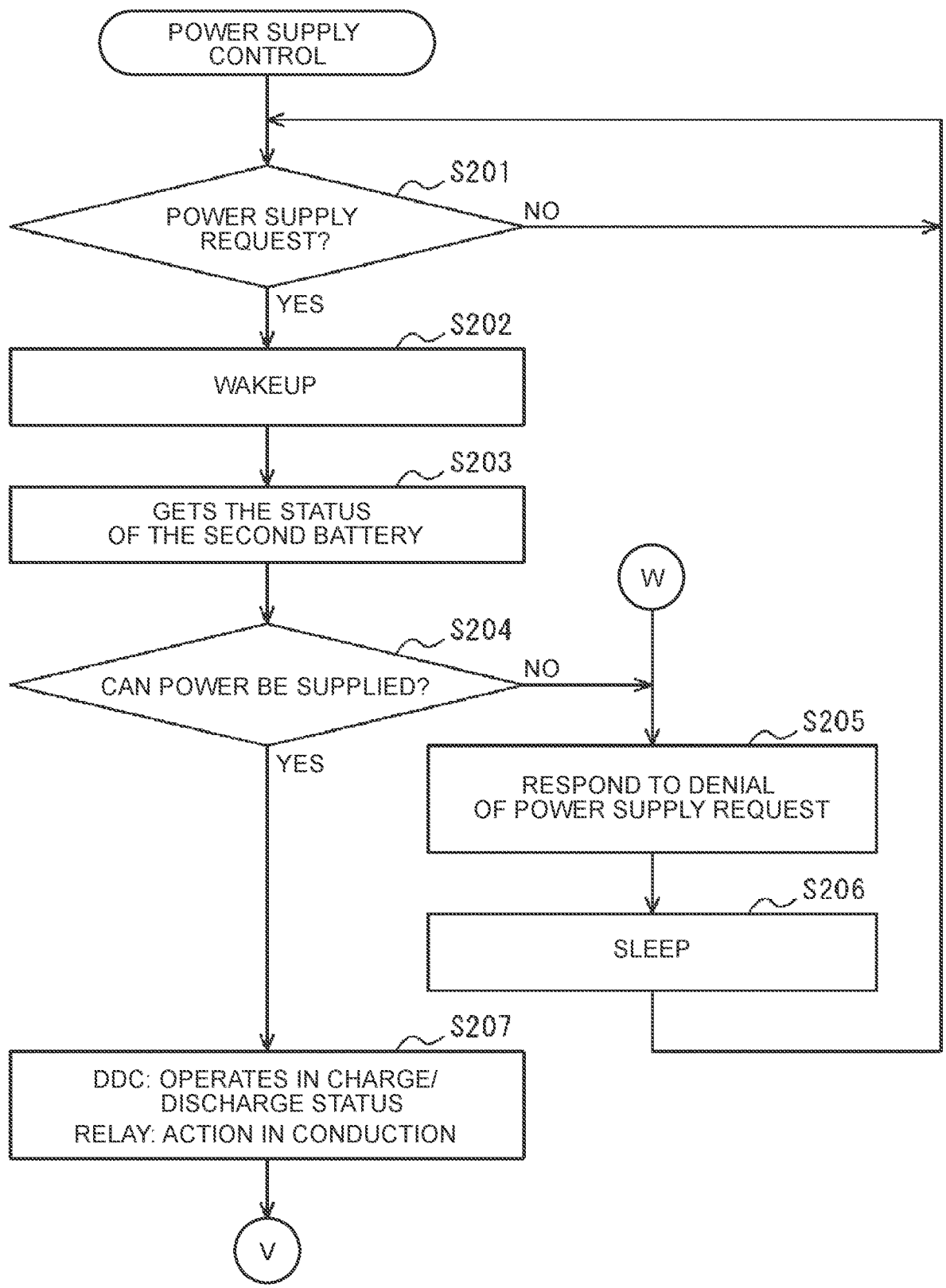
FIG. 2A is a flowchart illustrating a control process performed by a control device according to a first embodiment.
Figure 3:
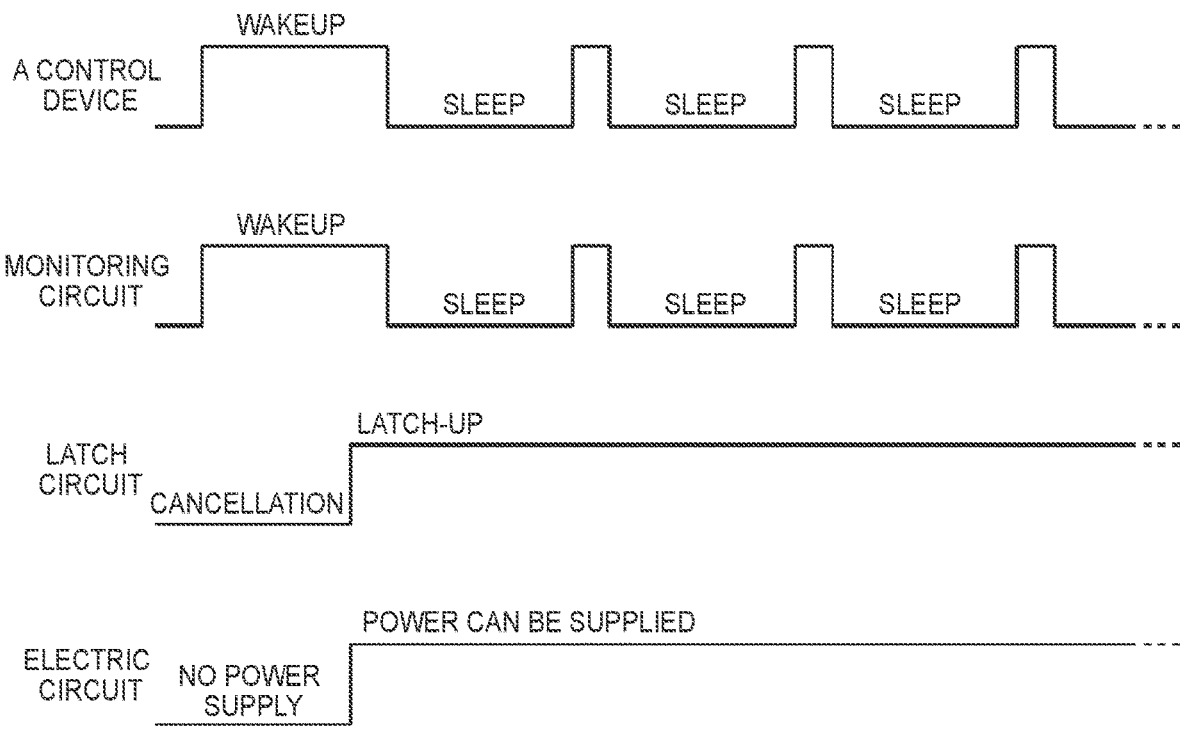
FIG. 3 is an operation timing diagram of each configuration in the power supply control performed by the control device according to the first embodiment.

Next, referring further to FIGS. 2A, 2B and 3, the control performed by the control device 110 according to the first embodiment when the multi-battery system 100 is mounted on a vehicle will be described. FIGS. 2A and 2B are flow charts for explaining a process sequence of power-supply control executed by the control device 110. The process of FIG. 2A and the process of FIG. 2B are connected by the couplers V and W. FIG. 3 is a timing chart of power supply control executed by the control device 110 according to the first embodiment.

The power supply control illustrated in FIGS. 2A and 2B is started when a situation in which the power of the redundantly provided second battery 120 is used as a backup power supply, such as, for example, when the ignition of the vehicle is turned IG-OFF, becomes a predetermined condition that is unlikely to occur. The power-supply control shown in FIGS. 2A and 2B is repeatedly performed until the predetermined condition is released. It is assumed that the control device 110 and the monitoring circuit 140 are both in the sleep state at the time when the power supply control is started.

S201 of Steps

The control device 110 determines whether there is a power supply request in a sleep state in which some functions (for example, functions other than the reception unit) are stopped. This power-supply requirement is transmitted and received using, for example, an in-vehicle network such as CAN. When the control device 110 determines that there is a power-supply demand (step S201, Yes), the process proceeds to step S202.

S202 of Steps

The control device 110 transitions from the sleep state to the wake-up state in which all functions are activated. In addition, the control device 110 transitions the monitoring circuit 140 in the sleep state to the wake-up state. When the control device 110 and the monitoring circuitry 140 are waked up, the process proceeds to step S203.

S203 of Steps

The control device 110 acquires the state of the second battery 120 monitored by the woken-up monitoring circuit 140. When the status of the second battery 120 is acquired by the control device 110, the process proceeds to step S204.

S204 of Steps

The control device 110 determines whether power can be supplied from the second battery 120 to the first battery 410, the electronic system 420, and the like based on the state of the second battery 120. This determination is made to suppress degradation of the second battery 120. Therefore, the control device 110 can determine whether or not power can be supplied based on the power required for the load, the amount of power stored in the first battery 410, and the like, in consideration of the lower limit of the amount of power stored in the second battery 120, and the like. If the control device 110 determines that power can be supplied (step S204, Yes), the process proceeds to step S207. If the control device 110 determines that power cannot be supplied (step S204, No), the process proceeds to step S205.

S205 of Steps

The control device 110 responds to the power supply request with a rejection because power cannot be supplied from the second battery 120 to the first battery 410, the electronic system 420, and the like. For example, the control device 110 returns an ACK indicating that power cannot be supplied to a load/system that has transmitted the power supply request. When the control device 110 rejects the power-supply request, the process proceeds to step S206.

S206 of Steps

The control device 110 transitions from the wake-up state to a sleep state in which some functions (for example, functions other than the reception unit) are stopped. In addition, the control device 110 causes the monitoring circuit 140 in the wake-up state to transition to the sleep state. When the control device 110 and the monitoring circuitry 140 sleep, the process proceeds to step S201.

S207 of Steps

The control device 110 controls the latch circuitry 150 to hold DC-DC converters (DDC) 130 in the charge/discharge state and the relays 161 in the conductive state (latch-up operation). Thus, the power supply from the second battery 120 to the first battery 410, the electronic system 420, and the like is started, and the state of the power supply is maintained. When DC-DC converters (DDC) 130 and relays 161 are held in their respective operating states, the process proceeds to step S208.

S208 of Steps

The control device 110 transitions from the wake-up state to a partial sleep state in which a function other than a specific function is stopped. This specific function is a timing function performed in a subsequent step. In addition, the control device 110 causes the monitoring circuit 140 in the wake-up state to transition to the sleep state. When the control device 110 partially sleeps and the monitoring circuitry 140 sleeps, the process proceeds to step S209.

S209 of Steps

The control device 110 starts measuring the time after transitioning to a partially sleep state. The time can be measured by using a predetermined counter. When the timing is started by the control device 110, the process proceeds to step S210.

S210 of Steps

The control device 110 determines whether or not a predetermined time has elapsed since the start of clocking. This determination is made to suppress over-discharge of the second battery 120. Therefore, the predetermined time is appropriately set based on the capacity of the second battery 120, the outflow current, and the like. When the control device 110 determines that the predetermined period has elapsed (step S210, Yes), the process proceeds to step S211.

S211 of Steps

The control device 110 transitions from the partially sleep state to the partially wake-up state in which the function stopped in the partially sleep state is reactivated. In addition, the control device 110 transitions the monitoring circuit 140 in the sleep state to the wake-up state. When the control device 110 partially wakes up and the monitoring circuitry 140 wakes up, the process proceeds to step S212.

S212 of Steps

The control device 110 acquires the state of the second battery 120 monitored by the woken-up monitoring circuit 140. When the status of the second battery 120 is acquired by the control device 110, the process proceeds to step S213.

S213 of Steps

The control device 110 determines whether power can be supplied from the second battery 120 to the first battery 410, the electronic system 420, and the like based on the state of the second battery 120. This determination is made to suppress degradation and over-discharge of the second battery 120. If the control device 110 determines that power can be supplied (step S213, Yes), the process proceeds to step S208. If the control device 110 determines that power cannot be supplied (step S213, No), the process proceeds to step S214.

By repeating the process from the step S208 to the step S213, the status of the second battery 120 can be periodically checked at a predetermined period. Therefore, the control device 110 can grasp in advance the signs that the second battery 120 is likely to be deteriorated or the signs that the battery is likely to be overdischarged. In this loop process, the power supply request may be checked again together with the confirmation of the state of the second battery 120. In this case, the control device 110 may wake up and control the latch circuit 150 again (e.g., change of the voltage indication value of DC-DC converter 130) only when the power value indicated by the power-supply request has changed from the time of the previous process.

S214 of Steps

The control device 110 transitions from a partially wakeup state to a wakeup state in which all functions are activated. When the control device 110 wakes up, the process proceeds to step S215.

S215 of Steps

The control device 110 controls the latch circuitry 150 to hold DC-DC converters (i.e., DDC) 130 is not charged or discharged) and the relays 161 (i.e., the latch-up release). As a result, the power supply from the second battery 120 to the first battery 410, the electronic system 420, and the like ends. When DC-DC converters (DDC) 130 and relays 161 are held in their respective operating states, the process proceeds to step S205.

According to the above-described power supply control, when there is power that can be supplied to the second battery 120, the latch-up operation of the latch circuit 150 keeps the electric circuit (DC-DC converters 130 and the relays 161) that connects the second battery 120 and the first battery 410, the electronic system 420, and the like electrically connected to each other. Thus, as illustrated in FIG. 3, even when the control device 110 and the monitoring circuit 140 are sleeping, power supply from the second battery 120 to the first battery 410, the electronic system 420, and the like is continued. Therefore, the power of the second battery 120 whose consumption is suppressed by the sleep of the control device 110 or the monitoring circuit 140 whose power consumption is larger than that of the electric circuit can be effectively utilized for the power supply to the load or the like.

Second Embodiment

Configuration

Figure 4:
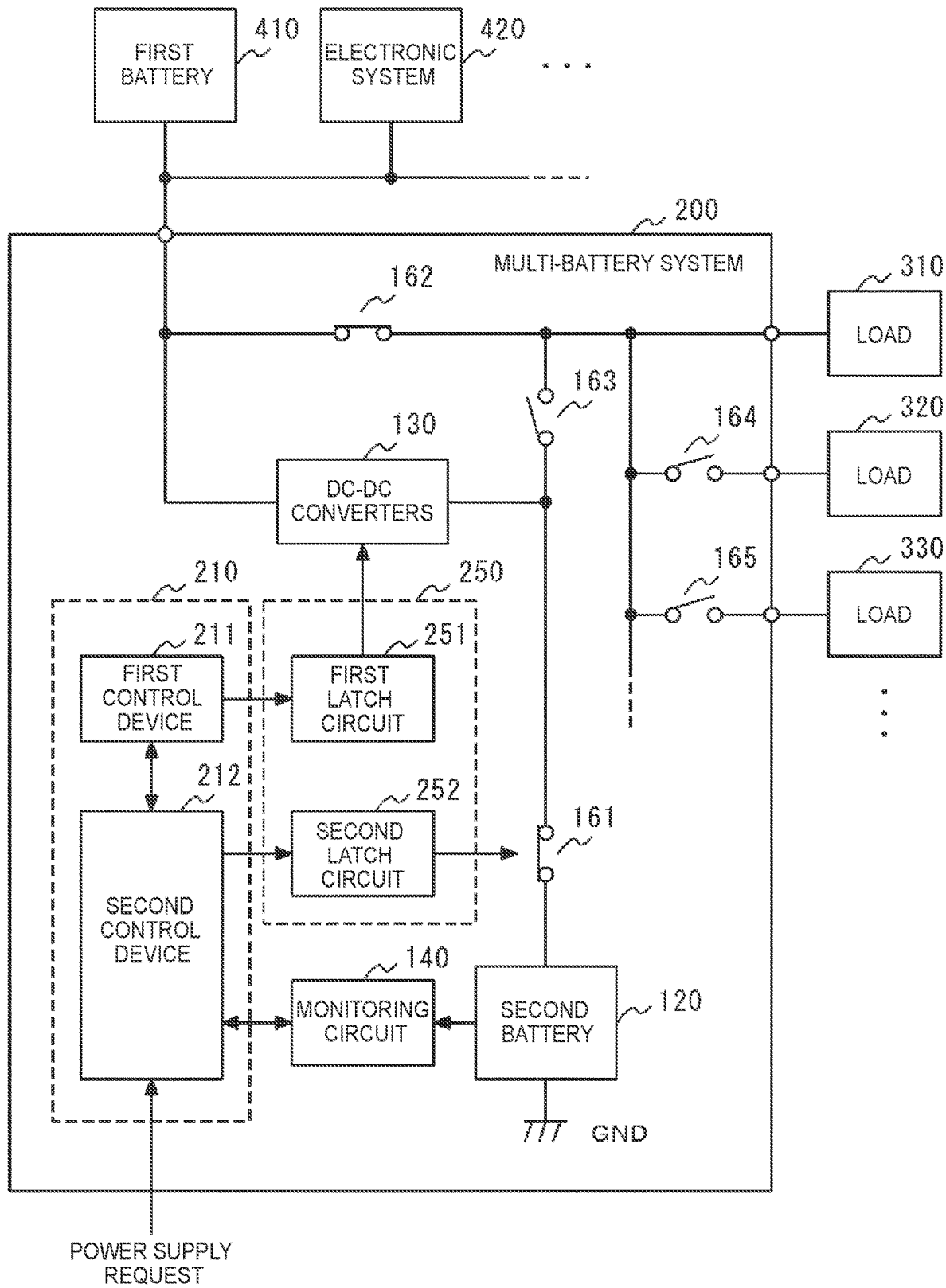
FIG. 4 is a functional block diagram of a multi-battery system including a control device according to a second embodiment of the present disclosure and a peripheral portion thereof.

FIG. 4 is a functional block diagram of a multi-battery system 200 including a control device 210 according to a second embodiment of the present disclosure and a peripheral portion thereof. The functional block illustrated in FIG. 4 includes a multi-battery system 200, a first battery 410, an electronic system 420, and a plurality of loads 310, 320, and 330 in a configuration. These configurations can be mounted on, for example, a vehicle.

The first battery 410, the electronic system 420, and the plurality of loads 310, 320, and 330 in the second embodiment are the same as those in the first embodiment. The first battery 410, the electronic system 420, and the plurality of loads 310, 320, and 330 in the second embodiment are denoted by the same reference numerals. The description is omitted.

The multi-battery system 200 is a power supply system (secondary power supply system) for backing up power to the plurality of loads 310, 320, and 330 instead of the first battery 410 when an abnormality occurs in power supply from the first battery 410 to the plurality of loads 310, 320, and 330 due to, for example, a power failure of the first battery 410. The multi-battery system 200 illustrated in FIG. 4 includes a control device 210 including a first control device 211 and a second control device 212, a second battery 120, a DC-DC converter 130, a monitoring circuit 140, a latch circuit 250 including a first latch circuit 251 and a second latch circuit 252, and a plurality of relays 161 to 165.

The second battery 120, DC-DC converters 130, the monitoring circuitry 140, and the plurality of relays 161 to 165 in the multi-battery system 200 of the second embodiment are similar to the multi-battery system 100 of the first embodiment. The second battery 120, DC-DC converters 130, the monitoring circuitry 140, and the plurality of relays 161 to 165 are identified by the same reference numerals. Some explanations of the second battery 120, DC-DC converters 130, the monitoring circuitry 140, and the plurality of relays 161 to 165 are omitted.

The first latching circuitry 251 is configured to maintain the operating status of DC-DC converters 130 based on instructions from the first control device 211. More specifically, when a predetermined instruction is given from the first control device 211, the first latch circuit 251 latches up DC-DC converters 130 in a chargeable/dischargeable operating condition.

The second latch circuit 252 is configured to hold the operation state of the relay 161 based on an instruction from the second control device 212. More specifically, when a predetermined instruction is given from the second control device 212, the second latch circuit 252 latches up the relay 161 in a conductive state.

The latch-up control of the first latch circuit 251 and the second latch circuit 252 maintains at least an electrical connection between the second battery 120 and the first battery 410 and the electronic system 420. In addition, a state in which power can be supplied from the second battery 120 to the first battery 410 and the electronic system 420 (or the plurality of loads 310, 320, and 330) is maintained. The first latch circuit 251 and the second latch circuit 252 may have a known circuit configuration.

The first control device 211 is configured to control the first latch circuit 251 so as to effectively utilize the power of the second battery 120. The first control device 211 has a function (first control unit) that controls the first latching circuitry 251 based on an instruction from the second control device 212 to suitably control the operation status of DC-DC converters 130. In addition, the first control device 211 can suitably transition between a wake-up state in which all functions are activated and a sleep state in which only some functions (for example, a function of accepting an instruction from the second control device 212) are activated and the remaining functions are stopped in order to suppress power consumption, based on an instruction from the second control device 212. Detailed control of the first control device 211 will be described later.

The second control device 212 is configured to control the monitoring circuit 140 and the second latch circuit 252 so as to effectively utilize the power of the second battery 120. The second control device 212 has a function (acquisition unit) of acquiring the state of the second battery 120 via the monitoring circuit 140. The second control device 212 has a function (reception unit) of receiving a predetermined power supply request from the outside of the multi-battery system 200. This power supply request is transmitted, for example, in the case of a vehicle, from a load (for example, the electronic system 420) in which power consumption of the first battery 410 occurs during parking or the like, at the start of a service or the like. When there is a power supply request, the second control device 212 has a function (second control unit) of controlling the second latch circuit 252 based on the state of the second battery 120 to suitably control the operation state of the relay 161. Further, the second control device 212 has a function (activation control unit) capable of suitably transitioning between a wake-up state in which all functions are activated and a sleep state in which only some functions (for example, a function of accepting a power supply request) are activated and the remaining functions are deactivated in order to suppress power consumption. This function can also instruct the first control device 211 to transition between a wakeup state in which all functions are activated and a sleep state in which some functions are deactivated. This function can also instruct the monitoring circuit 140 to transition between a wake-up state in which all functions are activated and a sleep state in which all functions are deactivated. Detailed control of the second control device 212 will be described later.

The first control device 211 may have a function (accepting unit) of the second control device 212 for accepting a predetermined power supply request from the outside of the multi-battery system 200. In this case, the first control device 211 that has received the power supply request appropriately transitions the wakeup state/sleep state of the second control device 212. The first control device 211 may also have a function (acquisition unit) of acquiring the state of the second battery 120 included in the second control device 212.

A part or all of the configuration of the first control device 211 may typically be configured as a microcomputer (main microcomputer) including a processor, a memory, an input/output interface, and the like. In addition, a part or all of the configuration of the second control device 212 may typically be configured as a microcomputer (sub-microcomputer) including a processor, a memory, an input/output interface, and the like. These microcomputers can realize some or all of the various functions described above by the processor reading and executing a program stored in the memory.

Control

Figure 5A:
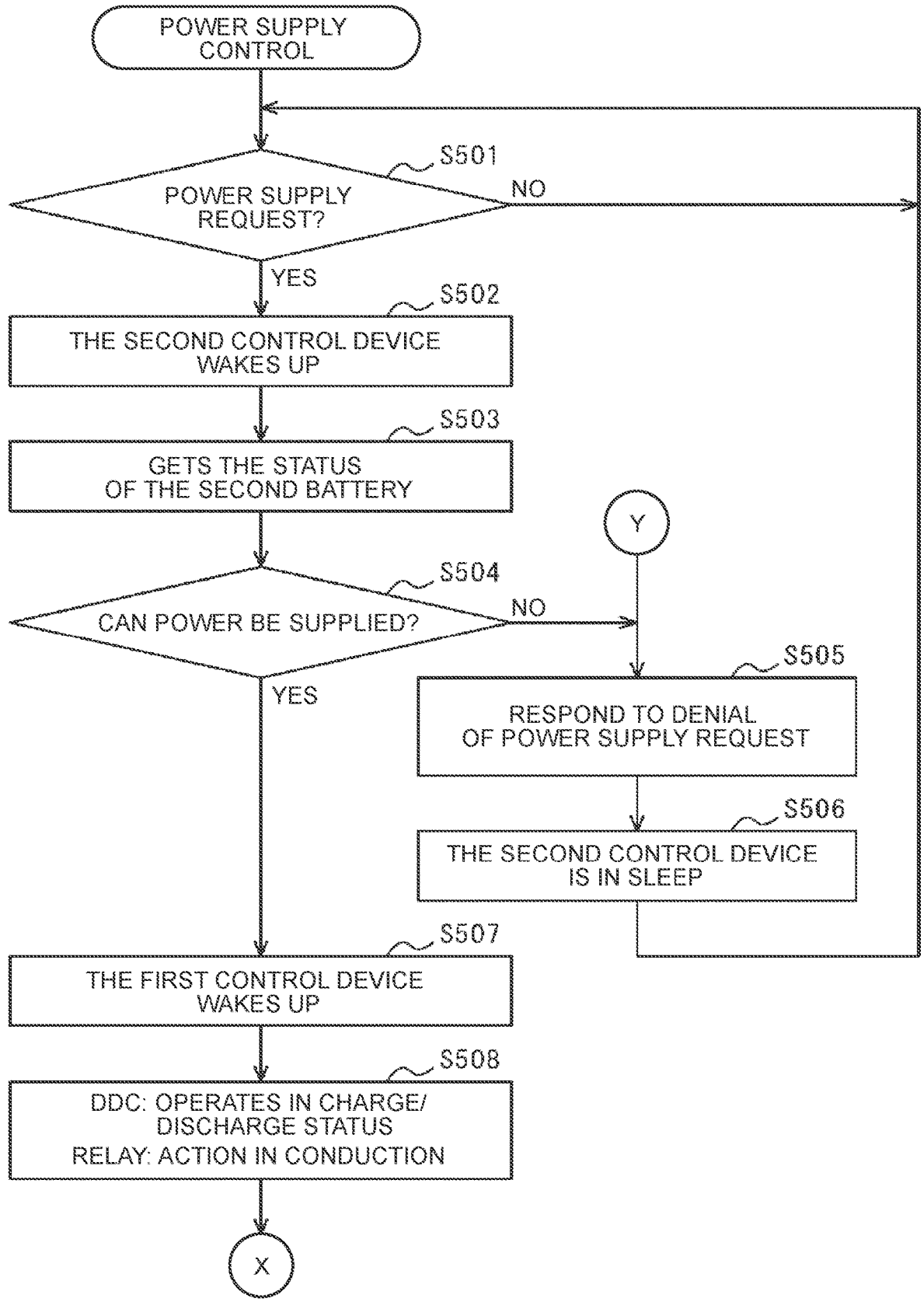
FIG. 5A is a process flow chart of the power supplying control performed by the control device according to the second embodiment.
Figure 5B:
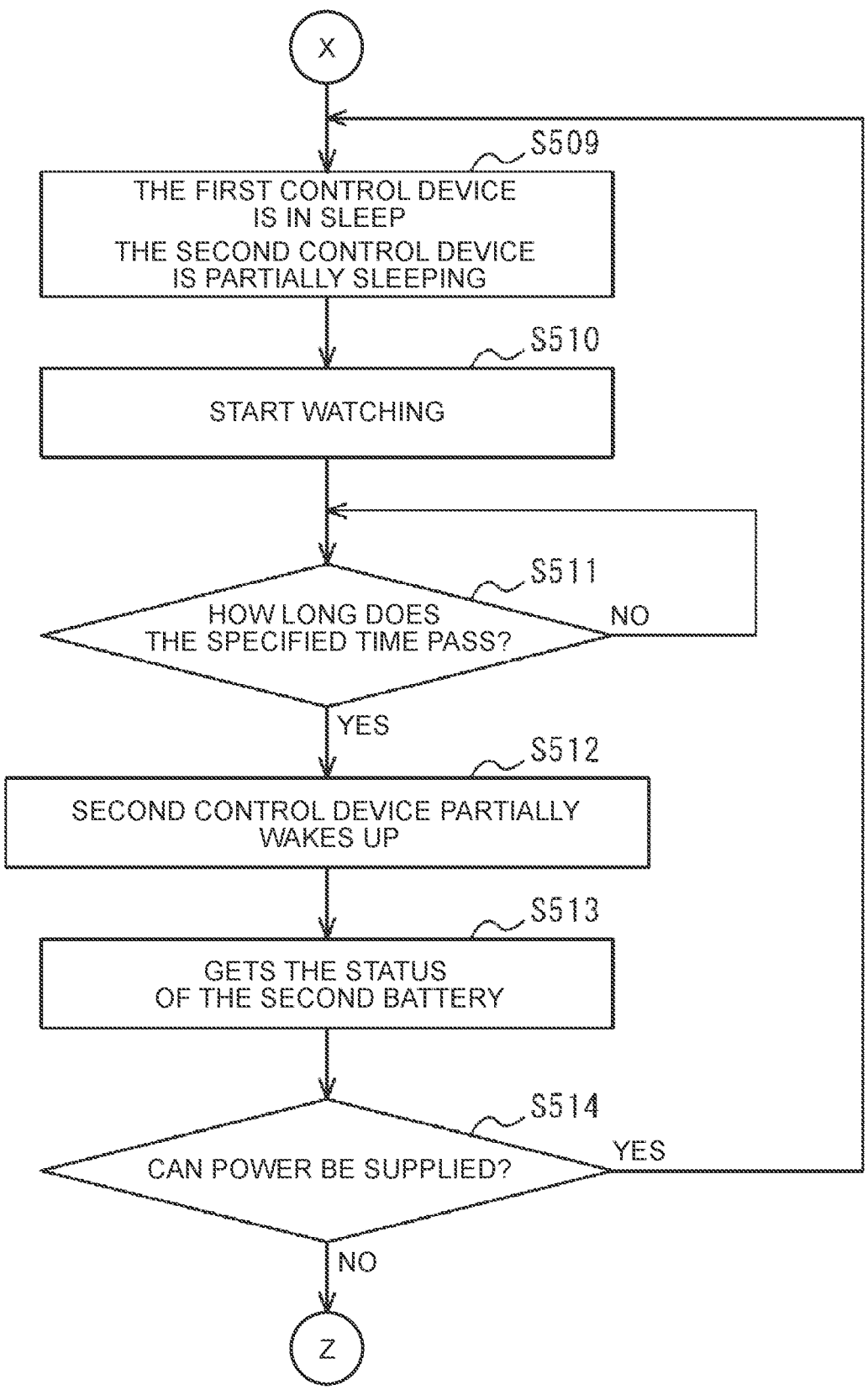
FIG. 5B is a process flow chart of the power supplying control performed by the control device according to the second embodiment.
Figure 5C:
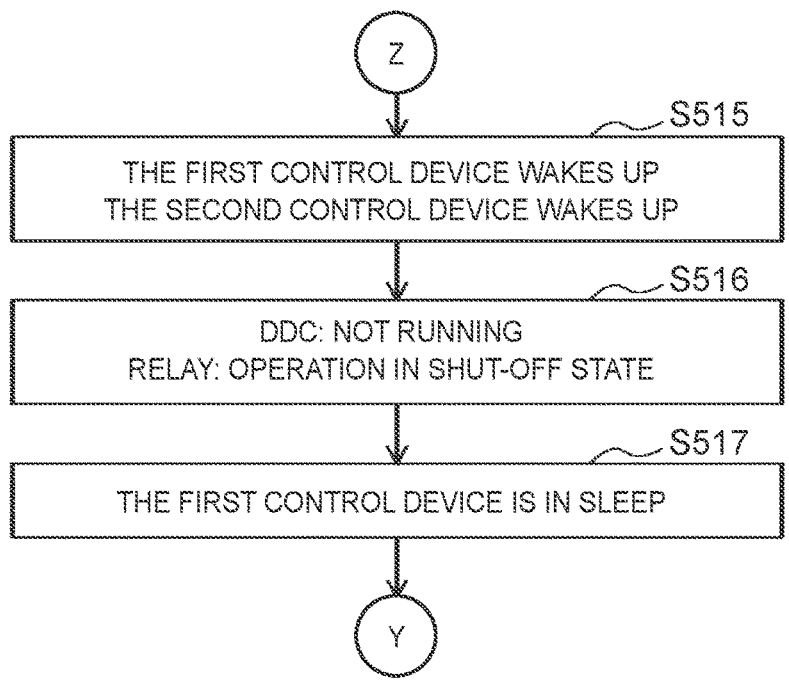
FIG. 5C is a process flow chart of power supplying control performed by a control device according to a second embodiment.
Figure 6:
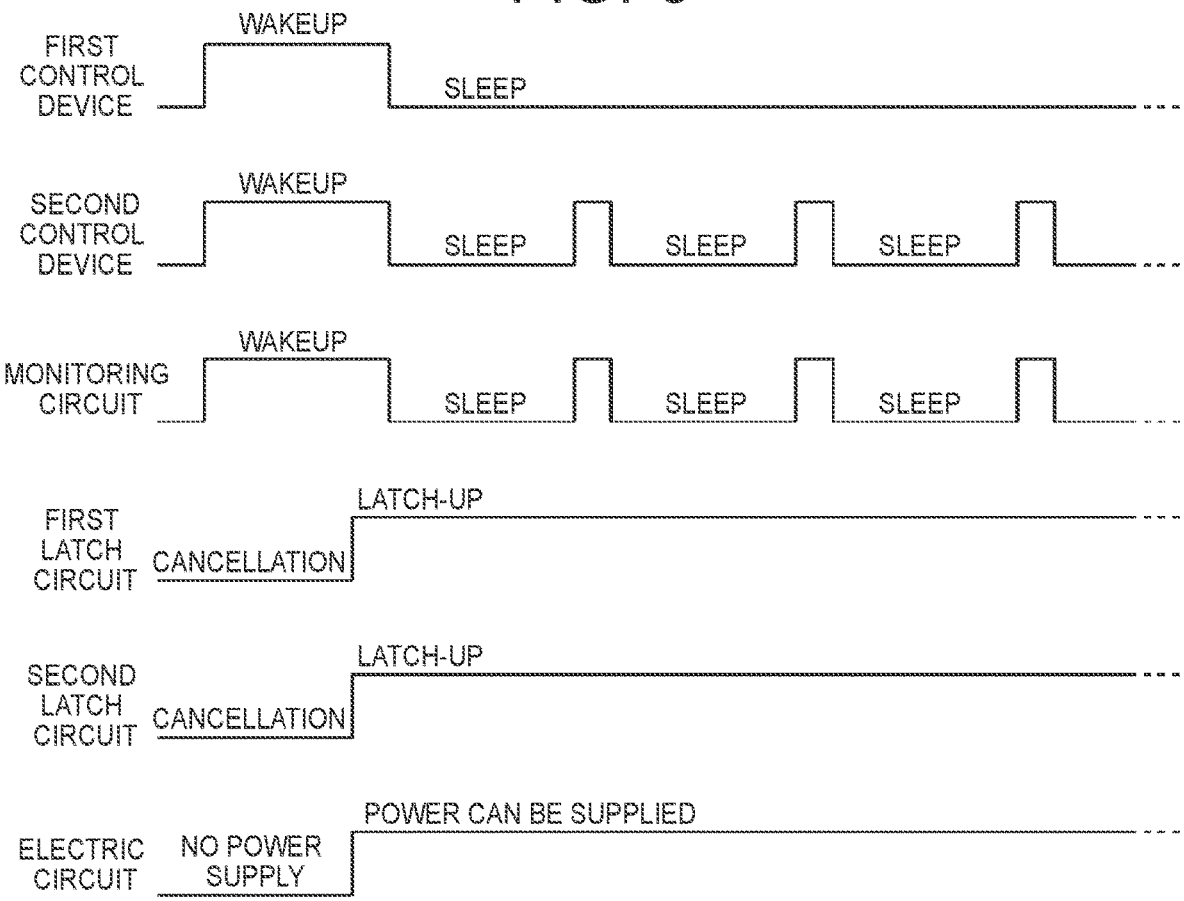
FIG. 6 is an operation timing diagram of respective components in the power-supply control performed by the control device according to the second embodiment.

Next, referring further to FIG. 5A, FIG. 5B, FIG. 5C, and FIG. 6, when the multi-battery system 200 is mounted in the vehicle, the control device 210 according to the second embodiment controls will be described. FIGS. 5A, 5B, and 5C are flow charts for explaining a process sequence of power-supply control executed by the control device 210. The processes of the FIGS. 5A, 5B, and 5C are linked by couplers X, Y, and Z. FIG. 6 is a timing chart of power supply control executed by the control device 210 according to the second embodiment.

The power supply control illustrated in FIGS. 5A, 5B, and 5C is started when a predetermined condition in which the power of the second battery 120, which is redundantly provided as a backup power source, is not likely to occur, such as, for example, when the ignition of the vehicle is turned IG-OFF. The power-supply control illustrated in FIGS. 5A, 5B, and 5C is repeatedly performed until the predetermined condition is released. It is assumed that the first control device 211, the second control device 212, and the monitoring circuit 140 are all in the sleep state at the time when the power supply control is started.

S501 of Steps

The second control device 212 determines whether there is a power supply request in a sleep state in which some functions (for example, functions other than the reception unit) are stopped. This power-supply requirement is transmitted and received using, for example, an in-vehicle network such as CAN. If the second control device 212 determines that there is a power-supply demand (step S501, Yes), the process proceeds to step S502.

S502 of Steps

The second control device 212 transitions from the sleep state to the wake-up state in which all functions are activated. The second control device 212 also transitions the monitoring circuit 140 in the sleep state to the wake-up state. When the second control device 212 and the monitoring circuit 140 wake up, the process proceeds to step S503.

S503 of Steps

The second control device 212 acquires the state of the second battery 120 monitored by the woken-up monitoring circuit 140. When the status of the second battery 120 is acquired by the second control device 212, the process proceeds to step S504.

S504 of Steps

The second control device 212 determines whether power can be supplied from the second battery 120 to the first battery 410, the electronic system 420, and the like based on the state of the second battery 120. This determination is made to suppress degradation of the second battery 120. Therefore, the second control device 212 can determine whether or not power can be supplied based on the power required for the load, the amount of power stored in the first battery 410, and the like, in consideration of the lower limit of the amount of power stored in the second battery 120, and the like. If the second control device 212 determines that power can be supplied (step S504, Yes), the process proceeds to step S507. If the second control device 212 determines that power cannot be supplied (step S504, No), the process proceeds to step S505.

S505 of Steps

The second control device 212 responds to the power supply request with a rejection because power cannot be supplied from the second battery 120 to the first battery 410, the electronic system 420, and the like. For example, the second control device 212 returns an ACK indicating that power cannot be supplied to the load/system that has transmitted the power supply request. When the second control device 212 rejects the power-supply request, the process proceeds to step S506.

S506 of Steps

The second control device 212 transitions from the wake-up state to a sleep state in which some functions (for example, functions other than the reception unit) are stopped. Further, the second control device 212 causes the monitoring circuit 140 in the wake-up state to transition to the sleep state. When the second control device 212 and the monitoring circuit 140 sleep, the process proceeds to step S501.

S507 of Steps

The first control device 211 transitions from the sleep state to the wake-up state in which all functions are activated. This transition is performed based on an instruction from the second control device 212 that determines that power can be supplied in the above-described step S504. When the first control device 211 wakes up, the process proceeds to step S508.

S508 of Steps

The first control device 211 controls the first latch circuitry 251 to hold DC-DC converters (DDC) 130 in a charge-discharge operation) (latch-up operation). The second control device 212 also controls the second latch circuit 252 to hold the relay 161 in a conductive state (latch-up operation). As a result, power supply from the second battery 120 to the first battery 410, the electronic system 420, and the like is started. The state of the power supply is maintained. When DC-DC converters (DDC) 130 and relays 161 are held in their respective operating states, the process proceeds to step S509.

S509 of Steps

The first control device 211 transitions from the wake-up state to a sleep state in which some functions are stopped. The second control device 212 transitions from the wake-up state to a partial sleep state in which a function other than a specific function is stopped. This specific function is a timing function performed in a subsequent step. Further, the second control device 212 causes the monitoring circuit 140 in the wake-up state to transition to the sleep state. When the first control device 211 and the monitoring circuit 140 sleep and the second control device 212 partially sleeps, the process proceeds to step S510.

S510 of Steps

The second control device 212 starts measuring the time after transitioning to a partially sleep state. The time can be measured by using a predetermined counter. When the timing is started by the second control device 212, the process proceeds to step S511.

S511 of Steps

The second control device 212 determines whether or not a predetermined time has elapsed since the start of clocking. This determination is made to suppress over-discharge of the second battery 120. Therefore, the predetermined time is appropriately set based on the capacity of the second battery 120, the outflow current, and the like. When the second control device 212 determines that the predetermined period has elapsed (step S511, Yes), the process proceeds to step S512.

S512 of Steps

The second control device 212 transitions from the partially sleep state to the partially wake-up state in which the function stopped in the partially sleep state is reactivated. The second control device 212 transitions the monitoring circuit 140 in the sleep state to the wake-up state. When the second control device 212 partially wakes up and the monitoring circuit 140 wakes up, the process proceeds to step S513.

S513 of Steps

The second control device 212 acquires the state of the second battery 120 monitored by the woken-up monitoring circuit 140. When the status of the second battery 120 is acquired by the second control device 212, the process proceeds to step S514.

S514 of Steps

The second control device 212 determines whether power can be supplied from the second battery 120 to the first battery 410, the electronic system 420, and the like based on the state of the second battery 120. This determination is made to suppress degradation and over-discharge of the second battery 120. If the second control device 212 determines that power can be supplied (step S514, Yes), the process proceeds to step S509. If the second control device 212 determines that power cannot be supplied (step S514, No), the process proceeds to step S515.

By repeating the process from the step S509 to the step S514, the status of the second battery 120 can be periodically checked at a predetermined period. Therefore, the second control device 212 can grasp in advance the signs that the second battery 120 is likely to deteriorate and the signs that the battery is likely to be overdischarged. In this loop process, the power supply request may be checked again together with the confirmation of the state of the second battery 120. In this case, the first control device 211 may wake up and control the first latch circuit 251 again (e.g., change of the voltage indication value of DC-DC converter 130) only when the power value indicated by the power-supply request has changed from the time of the previous process.

S515 of Steps

The first control device 211 transitions from the sleep state to the wake-up state in which all functions are activated. Further, the second control device 212 transitions from a partially wakeup state to a wakeup state in which all functions are activated. When the first control device 211 and the second control device 212 wake up, the process proceeds to step S516.

S516 of Steps

The first control device 211 controls the first latch circuitry 251 to hold DC-DC converters (DDC) 130 in a non-charged and non-discharged state (latch-up operation). In addition, the second control device 212 controls the second latch circuit 252 to hold the relay 161 in the shut-off state (latch-up release). As a result, the power supply from the second battery 120 to the first battery 410, the electronic system 420, and the like ends. When DC-DC converters (DDC) 130 and relays 161 are held in their respective operating states, the process proceeds to step S517.

S517 of Steps

The first control device 211 transitions from the wake-up state to a sleep state in which some functions are stopped. When the first control device 211 sleeps, the process proceeds to step S505.

According to the above-described power supplying control, when there is power that can be supplied to the second battery 120, the electric circuits (DC-DC converters 130 and the relays 161) that connect the second battery 120 and the first battery 410, the electronic system 420, and the like are kept electrically connected by the latch-up operation in cooperation between the first latch circuit 251 and the second latch circuit 252. Thus, as illustrated in FIG. 6, even when the first control device 211, the second control device 212, and the monitoring circuit 140 are sleeping, the power supply from the second battery 120 to the first battery 410, the electronic system 420, and the like is continued. Therefore, the power of the second battery 120 whose consumption is suppressed by the sleep of the first control device 211, the second control device 212, and the monitoring circuit 140, which consumes more power than the electric circuit, can be effectively utilized for power supply. Further, since the temporary activation for checking the state of the second battery 120 only requires the second control device 212, the power consumption can be further reduced as compared with the first embodiment.

In the multi-battery system 200, the first control device 211 and the second control device 212 are used to individually control DC-DC converters 130 and the relays 161. With this configuration, for example, even if an abnormality occurs in the first control device 211, the output voltage of DC-DC converters 130 becomes high, and the unintended charging of the second battery 120 is started, the relay 161 is shut off by the normal second control device 212, so that the charging of the second battery 120 can be suppressed. Further, for example, even if an abnormality occurs in the second control device 212 and the relay 161 cannot be shut off, the normal first control device 211 can control the output-voltage of DC-DC converters 130, and thus the overcharge of the second battery 120 can be suppressed.

Operations and Effects

As described above, in the control device according to each embodiment of the present disclosure, in a case where the state of the battery of the secondary power supply system is a state in which power can be supplied to a predetermined load or the like after the control device is activated in a predetermined situation, the control device controls the electric circuit interposing the battery and the predetermined load so that the state in which the battery and the predetermined load are electrically connected is maintained, and stops some functions and the like of the control device.

By this control, the power consumption of the control device can be suppressed while the power supply state from the battery to a predetermined load or the like is maintained. Therefore, power that would otherwise be consumed by some functions of the stopped control device can be applied to power supply to a predetermined load or the like. Therefore, it is possible to effectively utilize the electric power of the battery of the secondary power supply system.

An embodiment of the present disclosure has been described above. The present disclosure can be regarded as a control method executed by a control device including not only a control device but also a processor and a memory, a control program for executing the control method, a computer-readable non-transitory storage medium storing the control program, a vehicle equipped with the control device, and the like.

The control device and the like of the present disclosure can be used in a system employing a redundant power supply configuration and the like.

What is claimed is:

1. A control device that controls power supply from a battery to a predetermined load via an electric circuit, the control device comprising:
an acquisition unit that acquires a state of the battery; and
an activation control unit that:
is able to execute a state transition between activation and stop of the control device;
controls the electric circuit based on the state of the battery acquired by the acquisition unit; and
controls the electric circuit so as to maintain a state in which the battery and the predetermined load are electrically connected to each other and stops part of functions of the control device when the state of the battery is a state in which power is suppliable to the predetermined load after the control device is activated, wherein the electric circuit includes a DC-DC converter that controls charging and discharging of the battery, and a relay for disconnecting the battery from the DC-DC converter;
the activation control unit includes a first control unit that controls the DC-DC converter and a second control unit that controls the relay; and
one control unit from the first control unit and the second control unit includes the acquisition unit and the activation control unit, and the other control unit from the first control unit and the second control unit transitions an activation state and a stop state of the control device in accordance with control executed by the one control unit.

2. The control device according to claim 1, wherein the activation control unit controls the electric circuit so as to maintain a state in which the battery and the predetermined load are electrically disconnected from each other and stops the control device when the state of the battery is not a state in which power is suppliable to the predetermined load after the control device is activated.

3. The control device according to claim 1, wherein the activation control unit activates the control device upon receipt of a power-supply request from the predetermined load.

4. The control device according to claim 1, wherein the activation control unit periodically activates the part of the functions of the control device and determines the state of the battery while the part of the functions of the control device is stopped.

5. The control device according to claim 1, wherein the activation control unit maintains the DC-DC converter in a charge and discharge state and maintains the relay in a conductive state so as to maintain the state in which the battery and the predetermined load are electrically connected to each other.

6. The control device according to claim 1, wherein the one control unit determines the state of the battery by repeating activation and stop for each predetermined time while the state in which the battery and the predetermined load are electrically connected to each other is maintained.

7. The control device according to claim 1, wherein:
the control device is mounted on a vehicle; and
the activation control unit controls the electric circuit based on the state of the battery and executes the state transition between the activation and the stop during a period from when an ignition of the vehicle is turned off to when the ignition is turned on.

8. A control method executed by a control device that controls power supply from a battery to a predetermined load via an electric circuit, the electric circuit includes a DC-DC converter that controls charging and discharging of the battery, and a relay for disconnecting the battery from the DC-DC converter, the control method comprising:
an acquiring step of acquiring a state of the battery after the control device is activated;
a determining step of determining whether the state of the battery is a state in which power is suppliable to the predetermined load;
a controlling step of controlling the electric circuit so as to maintain a state in which the battery and the predetermined load are electrically connected to each other when the state of the battery is the state in which power is suppliable to the predetermined load; and
a stopping step of stopping part of functions of the control device after the electric circuit is controlled so as to maintain the state in which the battery and the predetermined load are electrically connected to each other, wherein the DC-DC converter is controlled via a first control unit and the relay is controlled via a second control unit, and one control unit from the first control unit and the second control unit performs the acquiring step, the determining step, the controlling step, and the stopping step, and the other control unit from the first control unit and the second control unit transitions an activation state and a stop state of the control device in accordance with control executed by the one control unit.

9. A non-transitory storage medium storing instructions executed by a computer of a control device to cause the computer to perform a method that controls power supply from a battery to a predetermined load via an electric circuit, the electric circuit includes a DC-DC converter that controls charging and discharging of the battery, and a relay for disconnecting the battery from the DC-DC converter, the method comprising:

an acquiring step of acquiring a physical quantity indicating a state of the battery after the control device is activated;

a determining step of determining whether the state of the battery is a state in which power is suppliable to the predetermined load;

a controlling step of controlling the electric circuit so as to maintain a state in which the battery and the predetermined load are electrically connected to each other when the state of the battery is the state in which power is suppliable to the predetermined load; and a stopping step of stopping part of functions of the control device after the electric circuit is controlled so as to maintain the state where the battery and the predetermined load are electrically connected to each other, wherein the DC-DC converter is controlled via a first control unit and the relay is controlled via a second control unit, and one control unit from the first control unit and the second control unit performs the acquiring step, the determining step, the controlling step, and the stopping step, and the other control unit from the first control unit and the second control unit transitions an activation state and a stop state of the control device in accordance with control executed by the one control unit.

* * * * *